United States Patent
Dijkstra et al.

(10) Patent No.: US 11,760,561 B2
(45) Date of Patent: Sep. 19, 2023

(54) CAPSULE, A SYSTEM FOR PREPARING A POTABLE BEVERAGE FROM SUCH A CAPSULE AND USE OF SUCH A CAPSULE IN A BEVERAGE PREPARATION DEVICE

(71) Applicant: Koninklijke Douwe Egberts B.V., Utrecht (NL)

(72) Inventors: Hielke Dijkstra, Utrecht (NL); Arend Hendrik Groothornte, Utrecht (NL); Erik Pieter van Gaasbeek, Utrecht (NL); Marc Henrikus Joseph Ottenschot, Utrecht (NL); Ralf Kamerbeek, Utrecht (NL); Armin Sjoerd Eijsackers, Utrecht (NL); John Henri Flamand, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 15/811,525

(22) Filed: Nov. 13, 2017

(65) Prior Publication Data
US 2018/0290824 A1 Oct. 11, 2018

Related U.S. Application Data

(63) Continuation of application No. PCT/NL2016/050341, filed on May 13, 2016.

(30) Foreign Application Priority Data

May 15, 2015 (WO) ................ PCT/NL2015/050351

(51) Int. Cl.
*B65D 85/804* (2006.01)
*A47J 31/36* (2006.01)
*A47J 31/40* (2006.01)

(52) U.S. Cl.
CPC ........ *B65D 85/8046* (2013.01); *A47J 31/369* (2013.01); *A47J 31/3623* (2013.01); *A47J 31/407* (2013.01); *B65D 85/8043* (2013.01)

(58) Field of Classification Search
None
See application file for complete search history.

(56) References Cited

U.S. PATENT DOCUMENTS

| 4,251,032 A | 2/1981 | Werding |
| 4,533,576 A | 8/1985 | Tanahashi |
| (Continued) | | |

FOREIGN PATENT DOCUMENTS

| AU | 2015255218 A1 | 11/2015 |
| AU | 2016253679 A1 | 11/2016 |
| (Continued) | | |

OTHER PUBLICATIONS

U.S. Appl. No. 15/811,524, filed Nov. 13, 2017, Koninklijke Douwe Egberts B.V.

(Continued)

*Primary Examiner* — Tu B Hoang
*Assistant Examiner* — Damon Joel David Alfaro
(74) *Attorney, Agent, or Firm* — Fitch, Even, Tabin & Flannery LLP

(57) ABSTRACT

A capsule containing a substance for the preparation of a beverage has an aluminum capsule body and a cover sheet hermetically closing off the capsule. The capsule body has a flange with a deformable sealing ring portion with an inner wall portion extending from and contiguous with an inner base portion of the flange, an outer wall portion extending from and contiguous with an outer base portion of the flange and a bridge portion interconnecting the inner wall portion and the outer wall portion. The bridge portion is located axially spaced from the base portions of the flange. In radial (Continued)

cross-sectional view, a top of the bridge portion axially most remote from the base portions of the flange is flat or has a center plane curved with a radius of curvature larger than two times a wall thickness of the top of the bridge portion.

32 Claims, 8 Drawing Sheets

(56) References Cited

U.S. PATENT DOCUMENTS

| | | |
|---|---|---|
| 4,651,538 A | 3/1987 | Bull |
| 4,913,951 A | 4/1990 | Pitolaj |
| 5,798,599 A | 8/1998 | Harwood |
| 5,897,899 A | 4/1999 | Fond |
| 6,550,157 B1 | 4/2003 | Harding |
| 6,854,378 B2 | 2/2005 | Jarisch |
| 7,743,635 B2 * | 6/2010 | Jentzsch ............ B21D 22/14 72/94 |
| 8,176,714 B2 * | 5/2012 | Abegglen ......... B29C 45/14336 53/452 |
| 8,535,743 B2 * | 9/2013 | Kamerbeek ........ B65D 85/8064 426/77 |
| 8,613,246 B2 | 12/2013 | Ryser |
| 9,833,107 B2 * | 12/2017 | Mariller .............. A47J 31/407 |
| 10,730,691 B2 * | 8/2020 | Halliday ........... B65D 85/8043 |
| 10,960,453 B2 | 3/2021 | Shabudin |
| 2001/0048178 A1 | 12/2001 | Jud |
| 2005/0061705 A1 | 3/2005 | Spallek |
| 2005/0084695 A1 | 4/2005 | Shirane |
| 2005/0155991 A1 | 7/2005 | Jackman |
| 2006/0110507 A1 | 5/2006 | Yoakim |
| 2007/0202237 A1 | 8/2007 | Yoakim |
| 2008/0044603 A1 | 2/2008 | Hutchinson |
| 2009/0017177 A1 * | 1/2009 | Yoakim ............... A47J 31/0684 426/431 |
| 2009/0223373 A1 * | 9/2009 | Kollep ............. B65D 85/8043 99/279 |
| 2009/0280219 A1 * | 11/2009 | Yoakim ............... A47J 31/3628 426/77 |
| 2009/0320692 A1 | 12/2009 | Simanski |
| 2010/0015307 A1 | 1/2010 | Abegglen et al. |
| 2010/0178404 A1 | 7/2010 | Yoakim |
| 2010/0183777 A1 | 7/2010 | Sagy |
| 2011/0000917 A1 | 1/2011 | Wolters |
| 2011/0020500 A1 * | 1/2011 | Eichler ............ B65D 85/8043 426/84 |
| 2011/0027547 A1 | 2/2011 | Xun |
| 2011/0041702 A1 * | 2/2011 | Yoakim ............ B65D 65/466 99/302 R |
| 2011/0185910 A1 * | 8/2011 | Ryser .................. A47J 31/0684 99/295 |
| 2011/0185911 A1 * | 8/2011 | Rapparini ............ B65D 65/466 99/295 |
| 2011/0200725 A1 * | 8/2011 | Kollep ................ A47J 31/3695 426/416 |
| 2011/0259204 A1 | 10/2011 | Kaeser |
| 2011/0315021 A1 * | 12/2011 | Eichler ............... B65D 85/8046 99/295 |
| 2012/0031794 A1 | 2/2012 | Ozanne |
| 2012/0225168 A1 | 9/2012 | Kamerbeek |
| 2012/0231123 A1 * | 9/2012 | Kamerbeek ............ A47J 31/369 426/112 |
| 2012/0244384 A1 | 9/2012 | Burt |
| 2012/0251671 A1 | 10/2012 | Kamerbeek |
| 2012/0251694 A1 | 10/2012 | Kamerbeek |
| 2012/0272830 A1 | 11/2012 | Gugerli |
| 2013/0099597 A1 | 4/2013 | Perentes et al. |
| 2013/0180408 A1 * | 7/2013 | Eichler ............. B65D 85/8046 99/295 |
| 2013/0206014 A1 | 8/2013 | Jarisch |
| 2013/0224341 A1 * | 8/2013 | BenDavid .......... B65D 85/8043 426/112 |
| 2013/0259982 A1 | 10/2013 | Abegglen |
| 2013/0340478 A1 | 12/2013 | Miyoshi |
| 2014/0170271 A1 | 6/2014 | Zweed et al. |
| 2014/0178537 A1 | 6/2014 | Zweed et al. |
| 2014/0199442 A1 | 7/2014 | Orsi |
| 2014/0328983 A1 | 11/2014 | Jarisch |
| 2015/0033947 A1 | 2/2015 | Van Der Kamp |
| 2015/0151903 A1 | 6/2015 | Bartoli |
| 2015/0158609 A1 | 6/2015 | Villain |
| 2015/0223632 A1 | 8/2015 | Hall |
| 2015/0297017 A1 | 10/2015 | Zingg |
| 2016/0037961 A1 | 2/2016 | Digiuni |
| 2016/0066591 A1 * | 3/2016 | Halliday ............... A47J 31/407 426/115 |
| 2016/0075506 A1 * | 3/2016 | Chapman ............ A47J 31/407 426/112 |
| 2016/0159563 A1 | 6/2016 | Bartoli |
| 2016/0353918 A1 | 12/2016 | Talon |
| 2016/0362246 A1 | 12/2016 | Garcin |
| 2016/0362247 A1 | 12/2016 | Bartoli |
| 2017/0158422 A1 | 6/2017 | Andreae |
| 2017/0325619 A1 | 11/2017 | Holten |
| 2018/0105355 A1 | 4/2018 | Harif |
| 2018/0257856 A1 | 9/2018 | Oliver |
| 2018/0273286 A1 | 9/2018 | Dijkstra |
| 2018/0289201 A1 | 10/2018 | Dijkstra |
| 2018/0290824 A1 | 10/2018 | Dijkstra |
| 2018/0290825 A1 | 10/2018 | Dijkstra |
| 2018/0297775 A1 | 10/2018 | Dijkstra |
| 2018/0297776 A1 | 10/2018 | Dijkstra |
| 2019/0077588 A1 | 3/2019 | Bartel |
| 2019/0177078 A1 | 6/2019 | Dijkstra |
| 2020/0047984 A1 | 2/2020 | Halliday |
| 2020/0047986 A1 | 2/2020 | Kamerbeek |
| 2020/0047987 A1 | 2/2020 | Kamerbeek |

FOREIGN PATENT DOCUMENTS

| | | |
|---|---|---|
| AU | 2017219060 A1 | 9/2017 |
| CA | 2901582 A1 | 11/2014 |
| CN | 105188488 | 12/2015 |
| DE | 10 2008 014 758 A1 | 10/2009 |
| DE | 20 2009 009 125 U1 | 10/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 11/2015 |
| DE | 202016106171 U1 | 11/2016 |
| EP | 0 468 079 | 1/1992 |
| EP | 0 844 195 B1 | 5/1998 |
| EP | 1 165 398 B1 | 12/2002 |
| EP | 1 190 959 B1 | 3/2004 |
| EP | 1 654 966 B1 | 5/2006 |
| EP | 1 700 548 A1 | 9/2006 |
| EP | 1 700 584 A1 | 9/2006 |
| EP | 1 299 022 B1 | 2/2007 |
| EP | 1 339 305 B1 | 4/2007 |
| EP | 1 816 934 B1 | 8/2007 |
| EP | 1 646 305 B1 | 9/2007 |
| EP | 1 849 715 B1 | 10/2007 |
| EP | 1 882 431 B1 | 1/2008 |
| EP | 1 892 199 A1 | 2/2008 |
| EP | 1 839 543 B1 | 6/2008 |
| EP | 1 859 712 B1 | 1/2009 |
| EP | 1 859 714 B1 | 2/2009 |
| EP | 2 070 828 B1 | 6/2009 |
| EP | 1 816 934 B1 | 11/2009 |
| EP | 1 967 099 B1 | 1/2010 |
| EP | 1 900 653 B1 | 3/2010 |
| EP | 2 029 457 B1 | 3/2010 |
| EP | 1 882 432 B1 | 7/2010 |
| EP | 2 230 195 A1 | 9/2010 |
| EP | 2 142 054 B1 | 1/2011 |
| EP | 2 068 684 B1 | 2/2011 |
| EP | 2289820 A1 | 3/2011 |
| EP | 2308776 A1 | 4/2011 |
| EP | 2 205 133 B1 | 6/2011 |
| EP | 2 284 100 B1 | 6/2011 |
| EP | 2 284 101 B1 | 9/2011 |

(56) References Cited

FOREIGN PATENT DOCUMENTS

| | | |
|---|---|---|
| EP | 2 364 930 A2 | 9/2011 |
| EP | 2 151 313 B1 | 10/2011 |
| EP | 2 229 082 B1 | 12/2011 |
| EP | 2 012 994 B1 | 7/2012 |
| EP | 2 385 922 B1 | 8/2012 |
| EP | 2 489 609 A1 | 8/2012 |
| EP | 2 374 383 B1 | 11/2012 |
| EP | 2 573 008 A1 | 3/2013 |
| EP | 2 631 198 A1 | 8/2013 |
| EP | 2 631 199 A1 | 8/2013 |
| EP | 2 512 302 B1 | 9/2013 |
| EP | 2 682 028 A1 | 1/2014 |
| EP | 2 690 035 A1 | 1/2014 |
| EP | 2 712 824 A1 | 4/2014 |
| EP | 2 757 056 A1 | 7/2014 |
| EP | 2 516 296 A1 | 8/2014 |
| EP | 2 801 538 A1 | 11/2014 |
| EP | 2 334 564 B1 | 3/2015 |
| EP | 2 868 598 A1 | 5/2015 |
| EP | 3 023 360 B1 | 1/2018 |
| ES | 1137034 U | 3/2015 |
| ES | 1142506 U | 8/2015 |
| FR | 2973209 A1 | 10/2012 |
| GB | 2 503 697 B | 12/2014 |
| GB | 2 519 319 A | 4/2015 |
| GB | 2 503 774 B | 6/2015 |
| GB | 2 523 775 A | 9/2015 |
| WO | 0056629 | 9/2000 |
| WO | 0200073 | 1/2002 |
| WO | 02035977 | 5/2002 |
| WO | 2005004683 | 1/2005 |
| WO | 2006045515 | 5/2006 |
| WO | 2006045537 | 5/2006 |
| WO | WO-2006/045536 A1 | 5/2006 |
| WO | 2007113110 | 10/2007 |
| WO | 2007122208 | 11/2007 |
| WO | WO-2007/122206 A1 | 11/2007 |
| WO | 2007137974 | 12/2007 |
| WO | WO-2008/037642 A1 | 4/2008 |
| WO | 2009043630 | 4/2009 |
| WO | 2009090201 | 7/2009 |
| WO | 2009115474 A1 | 9/2009 |
| WO | WO-2009/128016 A1 | 10/2009 |
| WO | 2010034663 | 4/2010 |
| WO | WO-2010/055465 A1 | 5/2010 |
| WO | WO-2010/084475 A2 | 7/2010 |
| WO | WO-2010/115970 A1 | 10/2010 |
| WO | WO-2010/116284 A2 | 10/2010 |
| WO | WO-2010/128844 A1 | 11/2010 |
| WO | 2010137946 | 12/2010 |
| WO | WO-2010/137952 A1 | 12/2010 |
| WO | WO-2011/000005 A1 | 1/2011 |
| WO | WO-2011/010263 A1 | 1/2011 |
| WO | 2011061126 | 5/2011 |
| WO | 2011073310 | 6/2011 |
| WO | 2011092301 | 8/2011 |
| WO | WO-2011/113854 A2 | 9/2011 |
| WO | WO-2012/011053 A1 | 1/2012 |
| WO | WO-2012/013556 A1 | 2/2012 |
| WO | WO-2012/038063 A1 | 3/2012 |
| WO | WO-2012/045184 A1 | 4/2012 |
| WO | 2012100836 | 8/2012 |
| WO | WO-2012/110323 A1 | 8/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | WO-2012/144885 A1 | 10/2012 |
| WO | WO-2013/043048 A1 | 3/2013 |
| WO | 2013053655 A1 | 4/2013 |
| WO | WO-2013/046014 A1 | 4/2013 |
| WO | WO-2013/060654 A1 | 5/2013 |
| WO | WO-2013/060918 A1 | 5/2013 |
| WO | WO-2013/068242 A1 | 5/2013 |
| WO | WO-2013/079811 A1 | 6/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | WO-2013/144838 A1 | 10/2013 |
| WO | WO-2013/153169 A2 | 10/2013 |
| WO | WO-2013/157924 A1 | 10/2013 |
| WO | WO-2013/157927 A1 | 10/2013 |
| WO | WO-2013/164669 A1 | 11/2013 |
| WO | WO-2013/189923 A1 | 12/2013 |
| WO | WO-2013/190426 A1 | 12/2013 |
| WO | WO-2014/001584 A1 | 1/2014 |
| WO | WO-2014/012779 A2 | 1/2014 |
| WO | WO-2014/012783 A2 | 1/2014 |
| WO | WO-2014/033344 A1 | 3/2014 |
| WO | WO-2014/053638 A1 | 4/2014 |
| WO | WO-2014/067507 A2 | 5/2014 |
| WO | WO-2014/072942 A2 | 5/2014 |
| WO | WO-2014/076041 A1 | 5/2014 |
| WO | WO-2014/118812 A1 | 8/2014 |
| WO | WO-2014/125390 A1 | 8/2014 |
| WO | WO-2014/128315 A1 | 8/2014 |
| WO | WO-2014/167526 A1 | 10/2014 |
| WO | WO-2014/184651 A1 | 11/2014 |
| WO | WO-2014/184652 A1 | 11/2014 |
| WO | WO-2014/184653 A1 | 11/2014 |
| WO | WO-2014184653 A1 * 11/2014 ......... B65D 85/8043 | |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | WO-2015/011683 A1 | 1/2015 |
| WO | WO-2015/056202 A1 | 4/2015 |
| WO | WO-2015/075584 A1 | 5/2015 |
| WO | WO-2015/082982 A1 | 6/2015 |
| WO | WO-2015/087180 A1 | 6/2015 |
| WO | WO-2015/101394 A1 | 7/2015 |
| WO | WO-2015/104171 A1 | 7/2015 |
| WO | WO-2015/104172 A1 | 7/2015 |
| WO | WO-2015/128527 A1 | 9/2015 |
| WO | WO-2015/128799 A1 | 9/2015 |
| WO | WO-2015/128827 A1 | 9/2015 |
| WO | WO-2015/180960 A1 | 12/2015 |
| WO | WO-2016/041596 A1 | 3/2016 |
| WO | 2016074189 A1 | 5/2016 |
| WO | 2016186488 A1 | 11/2016 |
| WO | WO-2016/186489 A1 | 11/2016 |
| WO | WO-2016/186491 A1 | 11/2016 |
| WO | WO-2016/186492 A1 | 11/2016 |
| WO | WO-2016/186496 A1 | 11/2016 |
| WO | WO-2017/074189 A1 | 5/2017 |

OTHER PUBLICATIONS

U.S. Appl. No. 15/811,528, filed Nov. 13, 2017, Koninklijke Douwe Egberts B.V.
U.S. Appl. No. 15/813,049, filed Nov. 14, 2017, Koninklijke Douwe Egberts B.V.
U.S. Appl. No. 15/813,054, filed Nov. 14, 2017, Koninklijke Douwe Egberts B.V.
U.S. Appl. No. 15/963,258, filed Apr. 26, 2018, Koninklijke Douwe Egberts B.V.
International Search Report and Written Opinion, PCT/NL2016/050342, Koninklijke Douwe Egberts B.V., 13 pages (dated Nov. 8, 2016).
International Search Report and Written Opinion, PCT/NL2016/050344, Koninklijke Douwe Egberts B.V., 13 pages (dated Oct. 27, 2016).
International Search Report and Written Opinion, PCT/NL2016/050346, Koninklijke Douwe Egberts B.V., 12 pages (dated Nov. 10, 2016).
International Search Report and Written Opinion, PCT/NL2016/050350, Koninklijke Douwe Egberts B.V., 13 pages (dated Nov. 2, 2016).
International Search Report and Written Opinion, PCT/NL2016/050749, Koninklijke Douwe Egberts B.V., 10 pages (dated Feb. 22, 2017).

(56) References Cited

OTHER PUBLICATIONS

International Search Report and Written Opinion, PCT/NL2016/050341, Koninklijke Douwe Egberts B.V., 13 pages (dated Oct. 27, 2016).
"Nespresso", Wikipedia Archive, published Nov. 29, 2012, 8 pages.
International Preliminary Report on Patentability, PCT/NL2016/050341, Koninklijke Douwe Egberts B.V., 8 pages (dated Nov. 21, 2017).
International Preliminary Report on Patentability, PCT/NL2016/050342, Koninklijke Douwe Egberts B.V., 8 pages (dated Nov. 21, 2017).
International Preliminary Report on Patentability, PCT/NL2016/050344, Koninklijke Douwe Egberts B.V., 8 pages (dated Nov. 21, 2017).
International Preliminary Report on Patentability, PCT/NL2016/050346, Koninklijke Douwe Egberts B.V., 7 pages (dated Nov. 21, 2017).
International Preliminary Report on Patentability, PCT/NL2016/050349, 7 pages (dated Nov. 21, 2017).
International Preliminary Report on Patentability, PCT/NL2016/050350, Koninklijke Douwe Egberts B.V., 8 pages (dated Nov. 21, 2017).
International Preliminary Report on Patentability, PCT/NL2016/050749, Koninklijke Douwe Egberts B.V., 7 pages (dated May 1, 2018).
International Preliminary Report on Patentability, PCT/NL2017/050663, 7 pages (dated Apr. 9, 2019).
International Search Report and Written Opinion, PCT/NL2017/050300, 13 pages (dated Jul. 19, 2017).
International Search Report and Written Opinion, PCT/NL2017/050301, 15 pages (dated Jul. 19, 2017).
International Search Report and Written Opinion, PCT/NL2017/050659, 12 pages (dated Jan. 17, 2018).
International Search Report and Written Opinion, PCT/NL2017/050663, 12 pages (dated Jan. 17, 2018).
International Search Report and Written Opinion, PCT/NL2018/050486, 14 pages (dated Oct. 18, 2018).
Notice of Opposition, dated Jan. 24, 2020 for EP Application No. 16744560.0, 41 pages.
Nullity Action on DE 202016106171.7, 96 pages (dated Dec. 20, 2019).
EPO Communication pursuant to Article 94(3) EPC, dated Mar. 18, 2022, EP Application No. 16744557.6, 4 pgs.
EPO Communication purusant to Article 94(3) EPC, dated Dec. 20, 2018, EP Application No. 16744557.6, 3 pgs.
EPO Communication purusant to Article 94(3) EPC, dated Jan. 17, 2018, EP Application No. 16744557.6, 4 pgs.
Reply to Dec. 20, 2018 communication pursuant to Art. 94(3) EPC, dated Jul. 1, 2019, EP Application No. 16744557.6, 53 pgs.
Reply to Jan. 17, 2018 communication pursuant to Art. 94(3) EPC, dated Jul. 19, 2018, EP Application No. 16744557.6, 19 pgs.
Reply to Mar. 18, 2022 communication pursuant to Art. 94(3) EPC, dated Sep. 28, 2022, EP Application No. 16744557.6, 13 pgs.
Third Party Observation, dated May 14, 2020, EP Application No. 16744557.6, 5 pgs.

\* cited by examiner

CAPSULE, A SYSTEM FOR PREPARING A POTABLE BEVERAGE FROM SUCH A CAPSULE AND USE OF SUCH A CAPSULE IN A BEVERAGE PREPARATION DEVICE

CROSS-REFERENCE TO RELATED APPLICATIONS

This application is a continuation of International Application Number PCT/NL2016/050341 filed May 13, 2016, which claims the benefit of and priority to International Application Number PCT/NL2015/050351 15 filed May 15, 2015. The entire contents of all of which are hereby incorporated herein by reference.

BACKGROUND

The invention relates to a capsule containing a substance for the preparation of a potable beverage by extracting and/or dissolving the substance by means of supplying a fluid under pressure into the capsule.

The invention also relates to a system for preparing a potable beverage from a capsule using a fluid supplied under pressure into the capsule and to a use of such a capsule.

Such a capsule, such a system and such a use are known from EP-B-1 700 548, which discloses a capsule provided with a sealing structure having the shape of a step, i.e. a sudden increase of the diameter of the side wall of the capsule, and the enclosing member of this known system has a sealing surface acting on the sealing structure to provide deflection of the sealing structure, the sealing surface being inclined so that the deflection of the sealing structure is an inwards and downwards deformation of the step. Furthermore in the known system the enclosing member comprises a capsule holder and a manually operated or an automatic mechanism for relative displacement of the enclosing member and the capsule holder. The manually operated or automatic mechanism applies a force on the sealing structure of the capsule when the enclosing member closes on the capsule holder. This force should ensure the fluid tight seal between the enclosing member and the capsule. Because the manually operated or automatic mechanism is arranged to be moved relative to the base, the sealing capabilities of the system can depend on the pressure of the fluid injected by the fluid injection means. If the pressure of the fluid increases, the force between the sealing structure of the capsule and the free end of the enclosing member increases too and thereby the force between the sealing structure of the capsule and the free end of the enclosing member increases also. Such a system is described further on. The sealing structure of the capsule must be arranged such that upon reaching the maximum fluid pressure in the enclosing member the sealing structure should still provide a fluid sealing contact between the enclosing member and the capsule. However, the sealing structure must also be arranged such that prior to, or at the start of, brewing when the pressure of the fluid in the enclosing member outside the capsule is relatively low, the sealing structure also provides a sealing contact between the enclosing member and the capsule. If at the start of brewing, there would not exist a sealing contact between the capsule and the enclosing member, leakage will occur. However, if leakage occurs there is a real chance that the pressure in the enclosing member and outside the capsule will not sufficiently increase for increasing the force on the sealing structure by means of the free end of the enclosing member if the manually operated or automatic mechanism moves the enclosing member towards the capsule holder. Only if there is a sufficient initial sealing, the pressure in the enclosing member will increase whereby also the force of the free end of the enclosing member acting on the sealing structure of the capsule will increase for providing a sufficient sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

SUMMARY

It follows from the above that the sealing structure is a member which is very critical in design. It should be able to provide a sealing contact between the enclosing member and the capsule at a relatively low fluid pressure if only a relatively small force is applied on the sealing structure by means of the free end of the enclosing member but it should also provide a sealing contact at a much higher fluid pressure in the enclosing member outside the capsule if a higher force is applied by means of the free end of the enclosing member to the sealing structure of the capsule. In particular when the annular end surface of the enclosing member is provided with radially extending open grooves which act as air inlet passage once the force between the enclosing member and the capsule holder is released so that it is easier for a user to take out the capsule, the sealing structure must also be able to 'close' the radially extending open grooves to provide an effective seal.

From WO2012/120459, a capsule is known in which the sealing structure includes a deformable portion of the outwardly projecting flange of the capsule body. However, for ensuring that the sealing ring portion provides a sealing contact against the annular end surface of the enclosing member, as it is deformed between that annular surface and the closing member, the annular end surface of the enclosing member has deforming means in the form of a shallow, rounded groove extending in circumferential sense of the annular surface. In operation, the shallow, rounded groove ensures that an upstanding rib of the deformable portion folds over inwardly. Accordingly, reliable functioning of such capsules will be ensured for use in particular beverage preparation devices only.

It is an object of the invention to provide a capsule that reliably seals against the annular end surface of an enclosing member of a beverage preparation device if the capsule is positioned in the enclosing member of the beverage preparation device and the enclosing member is closed by means of a closing member of the beverage preparation device, such as an extraction plate of the beverage preparation device, a portion of the outwardly extending flange of the capsule and the sealing structure of the capsule being clamped between the annular end surface of the enclosing member and the closing member of the beverage preparation device, even in case of an enclosing member of which the annular end surface is provided with radially extending open grooves and which can still be manufacture at low costs and is environmentally friendly and easily recyclable after the capsule has been disposed of after use. In many of the known capsules, the sealing member is made from an elastic material such as rubber elastic material, more specific such as a silicon material which after use, should be separated from the aluminum base and cover for recycling purposes.

This object is achieved by providing a capsule containing a substance for the preparation of a potable beverage by extracting and/or dissolving the substance by means of supplying a fluid under pressure into the capsule.

Because the sealing structure includes a deformable sealing ring portion of the flange, the sealing ring portion projecting axially from base portions of the flange on a side of the base portions opposite of the cover, the sealing structure is integrated in the flange of the capsule, so the capsule can be manufactured quickly at low costs and the aluminum capsule body can be recycled easily. In the present context, the meaning of 'aluminum' is understood to also include aluminum alloy.

Because a top of the bridge portion axially most remote from the base portions of the flange is flat or has a center plane curved with a radius of curvature larger than two times a wall thickness of said top of the bridge portion, the bridge portion is easily deformable locally at low clamping pressure to accommodate to the shape of the annular end surface of the enclosing member when clamped between the annular end surface of the enclosing member and the closing member. Even in case of an enclosing member of which the annular end surface is provided with radially extending open grooves, the sealing structure can accommodate to the succession of projections and recesses in circumferential sense formed by the annular end surface of the enclosing member and effectively seal, also against the recessed surface portions of the annular end surface already during an early stage of the closing of the enclosing member when the clamping pressure at which the enclosing member and the closing member are pressed against each other is relatively low.

It is noted that for the sealing between the annular end surface of the enclosing member and the sealing ring portion of the flange to be effective for ensuring that the pressure drop over the substance in the capsule is sufficient for the desired beverage preparation process, it does not have to be hermetically fluid tight under all circumstances. At a liquid leakage of up to 4% and preferably not beyond 2.5% of the liquid volume pumped through the capsule, the seal is still effective for allowing the beverage preparation apparatus to generate the desired pressure drop over the substance. Accordingly, a sealing allowing such a leakage constitutes an effective sealing.

The invention can also be embodied in a system for preparing a potable beverage from a capsule using a fluid supplied under pressure into the capsule and in a use of such a capsule. In operation of such a system and in such a use, the bridge portion easily deforms locally, thereby accommodating to the shape of the annular end surface of the enclosing member when it is clamped between the annular end surface of the enclosing member and the closing member. More in particular, the sealing structure accommodates to the succession of projections and recesses in circumferential sense formed by the annular end surface of the enclosing member and effectively seals, also against the recessed surface portions of the annular end surface already during an early stage of the closing of the enclosing member, when the clamping pressure at which the enclosing member and the closing member are pressed against each other is relatively low.

A good conformability to the shape of the annular end surface and accordingly a particularly effective and reliable sealing already at low sealing pressure can be achieved if at least a portion of the top of the bridge portion has a reduced wall thickness smaller than a wall thickness of the inner and outer wall portions.

If the capsule body has a coating to at least one side, leaving out the coating in at least the portion of the top of the bridge portion having a reduced wall thickness reduces the risk of the coating being damaged or becoming unstuck during relatively large deformations occurring when the wall thickness is reduced during manufacturing. The coating may also be removed while reducing the wall thickness during manufacturing, for instance if reducing the wall thickness involves removing wall material.

A further enhanced sealing effect can be achieved if the uncoated portion of the bridge portion is on a side of the flange opposite of the cover and has a textured surface. A texture in the surface can further improve the conformability during early stages of clamping, when the sealing pressure is still low, because clamping force is transferred via raised portions of the texture only, so that at the raised portions a higher contact pressure is exerted than would be exerted over a full smooth contact surface.

A particularly improved sealing effect can be achieved if the textured surface includes ridges and valleys extending in circumferential sense of the flange, because early conformation to the shape of the annular end surface is then achieved in generally annular areas or ring sectors extending mainly in circumferential sense.

The invention can also be embodied in a method for manufacturing a capsule starting from a semi-finished deep drawn cup member. The coating is efficiently removed from the portion of the flange of which the wall thickness is to be reduced prior to or during reducing the wall thickness.

A particularly efficient manufacturing of the reduced wall thickness can be achieved if the coating is removed from the portion of the flange of which the wall thickness is to be reduced during a material removal step for removing wall material for reducing the wall thickness.

However, a coating on the top portion of the bridge portion, either the same coating as on the remainder of the outer surface of the capsule body or a coating different from the coating on the remainder of the outer surface of the capsule body, can also improve sealing, for instance by reducing friction between the annular end surface of the enclosing member and a surface portion of the sealing ring portion in contact with the annular end surface, which facilitates accommodation of the sealing ring portion in contact with the annular end surface to the shape of the annular end surface.

If one of the inner and outer wall portions is oriented at a different angle to the base portions of the flange than the other one of the inner and outer wall portions, accurate and reliable deformation of the sealing structure to a predetermined shape during sealing can be achieved. In particular the occurrence of transitions between circumferential portions deforming to different end shapes, entailing an increased risk of leakage, is thereby counteracted.

This effect can be achieved particularly effectively if one of the inner and outer wall portions extends at an oblique angle, preferably of 20-60°, and more preferably 30-50°, relative to a plane of the associated contiguous base portion of the flange and the other one of the inner and outer wall portions extends from the associated contiguous base portion of the flange at a steeper or opposite angle, preferably 60-160°, and more preferably 70-150° relative to a plane of the associated contiguous base portion of the flange.

For a smooth, accurate and reliable deformation to a predetermined shape, it is advantageous if, in cross-sectional view, at least a portion of at least one of the inner and outer wall portions has a curved center plane, in particular if the curved portion of the at least one of the inner and outer wall portions is contiguous to the curvature of the top of said bridge portion and if, in cross-sectional view, the deformable portion is Ω shaped. Another advantage of an Ω shape is that only a small gap is left between inner and outer base portions of the flange so that a large surface area for adherence of the cover to the flange is left.

For obtaining a high counter pressure during a final stage of deformation of the sealing structure, a support member may be provided between the inner and outer wall portions.

A particularly easy accommodation to the shape of the annular end surface may be achieved if, the top of the bridge portion is positioned for being contacted first by the annular end portion, when the sealing ring portion is clamped between the annular end surface and the closing member of a compatible beverage preparation device.

The top of the bridge portion forms a rounded or flat crest extending circumferentially around the center line of the capsule. By providing that the crest formed by the top of the bridge portion has a diameter of 29-33 mm, more preferably 30.0-31.4 mm and most preferably 30.3-31.0 mm, the top of the bridge portion is located centrally relative to the annular end surface for first contacting a central portion of said annular end surface when the sealing ring portion is clamped between the annular end surface and said closing member of widely used and commercially available beverage preparation devices such as the Citiz, Lattisima, U, Maestria, Pixie, Inissia and Essenza.

The invention is in particular advantageous when in an embodiment of a capsule the capsule is filled with 5-20 grams, preferably 5-10 grams, more preferably 5-7 grams of an extractable product, such as roasted and ground coffee.

In an embodiment of a capsule according to the invention which is in particular easy to manufacture the outer diameter of the outwardly extending flange of the capsule is larger than the diameter of the bottom of the capsule. Preferably, the outer diameter of the outwardly extending flange is approximately 37.1 mm and the diameter of the bottom of the capsule is about 23.3 mm.

The invention is in particular advantageous when in an embodiment of a capsule the thickness of the aluminum capsule body is 20 to 200 micrometer, preferably 100 micrometer.

The invention is in particular advantageous when in an embodiment of a capsule the thickness of the aluminum cover is 15 to 65 micrometer, preferably 30-45 micrometer and more preferably 39 micrometer.

In an embodiment of a capsule according to the invention the thickness of the aluminum cover is smaller than the thickness of the aluminum capsule body.

In a further embodiment of a capsule according to the invention the aluminum cover is arranged to tear open on a closing member of the beverage preparation device, such as an extraction plate of the beverage preparation device under the influence of fluid pressure in the capsule.

In an embodiment of a capsule according to the invention which is in particular easy to manufacture the side wall of the aluminum capsule body has a free end opposite the bottom, the outwardly extending flange extending from said free end of the side wall in a direction at least substantially transverse to the central capsule body axis. Preferably, the outwardly extending flange comprises a curled outer edge, which is beneficial in obtaining for a satisfactory sealing with the annular end surface provided with radially extending open grooves. The radius about the central capsule body axis of an inner edge of the curled outer edge of the outwardly extending flange is preferably at least 32 mm, so that clearance from the annular end surface of the enclosure member is ensured. It is then preferred that the sealing structure is positioned between the free end of the side wall of the aluminum capsule body and an inner edge of the curled outer edge of the outwardly extending flange to obtain a still further satisfactory sealing.

To ensure that the curled outer edge does not interfere with operation of a wide variety of commercially available and future beverage preparation apparatuses, the outwardly extending flange has a largest radial cross-sectional dimension of about 1.2 millimeter.

The invention is in particular beneficial for capsules of which the inner diameter of the free end of the side wall of the aluminum capsule body is about 29.5 mm. The distance between the free end of the side wall of the aluminum capsule body and an outermost edge of the outwardly extending flange can be about 3.8 millimeter. The preferred height of the aluminum capsule body is about 28.4 mm.

In an embodiment of a capsule according to the invention which after use is easier for a user to take out of a beverage preparation device the aluminum capsule body is truncated, wherein preferably the side wall of the aluminum capsule body encloses an angle with a line transverse to the central capsule body axis of about 97.5°.

In an advantageous embodiment of a capsule according to the invention the bottom of the aluminum capsule body has a largest inner diameter of about 23.3 mm. It is preferred that the bottom of the aluminum capsule body is truncated, preferably having a bottom height of about 4.0 mm and that the bottom further has a generally flat central portion opposite the cover having a diameter of about 8.3 mm.

In practically all cases a satisfactory seal can be obtained in an embodiment of a capsule according to the invention in which the height of the sealing structure is at least about 0.1 mm, more preferably at least 0.2 mm and most preferably at least 0.8 mm and at most 3 mm, more preferably at most 2 mm and most preferably at most 1.2 mm.

Regarding the preferred embodiments of the system as mentioned in the dependent claims which relate to the same features as the features of the dependent claims of the capsule reference is made to the above.

The invention is particularly suitable in a system according to the invention wherein, in use, the maximum fluid pressure in the enclosing member of the beverage preparation device is in the range of 6-20 bar, preferably between 12 and 18 bar. Even at such high pressures a satisfactory seal between capsule and beverage preparation device can be obtained.

Preferably the system is arranged such that, in use, during brewing, a free end of the enclosing member of the beverage preparation device exerts a force F2 on the sealing structure of the capsule to provide a sealing contact between the outwardly extending flange of the capsule and the enclosing member of the beverage preparation device, wherein F is in the range of 500-1500 N preferably in the range of 750-1250 N when the fluid pressure P2 in the enclosing member of the beverage preparation device outside the capsule is in the range of 6-20 bar, preferably between 12 and 18 bar. In particular the system is arranged such that, in use, prior to or at the start of brewing, a free end of the enclosing member of the beverage preparation device exerts a force F1 on the sealing structure of the capsule to provide a sealing contact between the outwardly extending flange of the capsule and the enclosing member of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar.

In an embodiment of a system according to the invention wherein the plurality of radially extending open grooves are uniformly spaced relative to each other in tangential direction of the annular end surface of the annular element of the beverage preparation device so that it is easier for a user to take out the capsule while a satisfactory seal between capsule and beverage preparation device can still be provided.

In an advantageous embodiment of a system according to the invention the longest tangential width of each groove (top to top, i.e. equal to the groove to groove pitch) is 0.9-1.1 mm, preferably 0.95 to 1.05 mm, more preferably 0.98 to 1.02 mm, wherein a maximal height of each groove in an axial direction of the enclosing member of the beverage preparation device is 0.01-0.09 mm, preferably 0.03 to 0.07 mm, more preferably 0.045 to 0.055 mm, most preferred 0.05 mm and wherein the number of grooves is 90 to 110, preferably 96. The radial width of the annular end surface at the location of the grooves may for instance be 0.05-0.9 mm, preferably 0.2-0.7 mm and more preferably 0.3-0.55 mm.

The invention is in particular suitable when applied to an embodiment of system according to the invention in which during use when the closing member of the beverage preparation device closes the enclosing member of the beverage preparation device the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device.

BRIEF DESCRIPTION OF THE DRAWINGS

Further aspects, effects and details of the invention will now be further described with reference to, non-limiting, examples shown in the drawing, in which.

DETAILED DESCRIPTION

Figure 1:
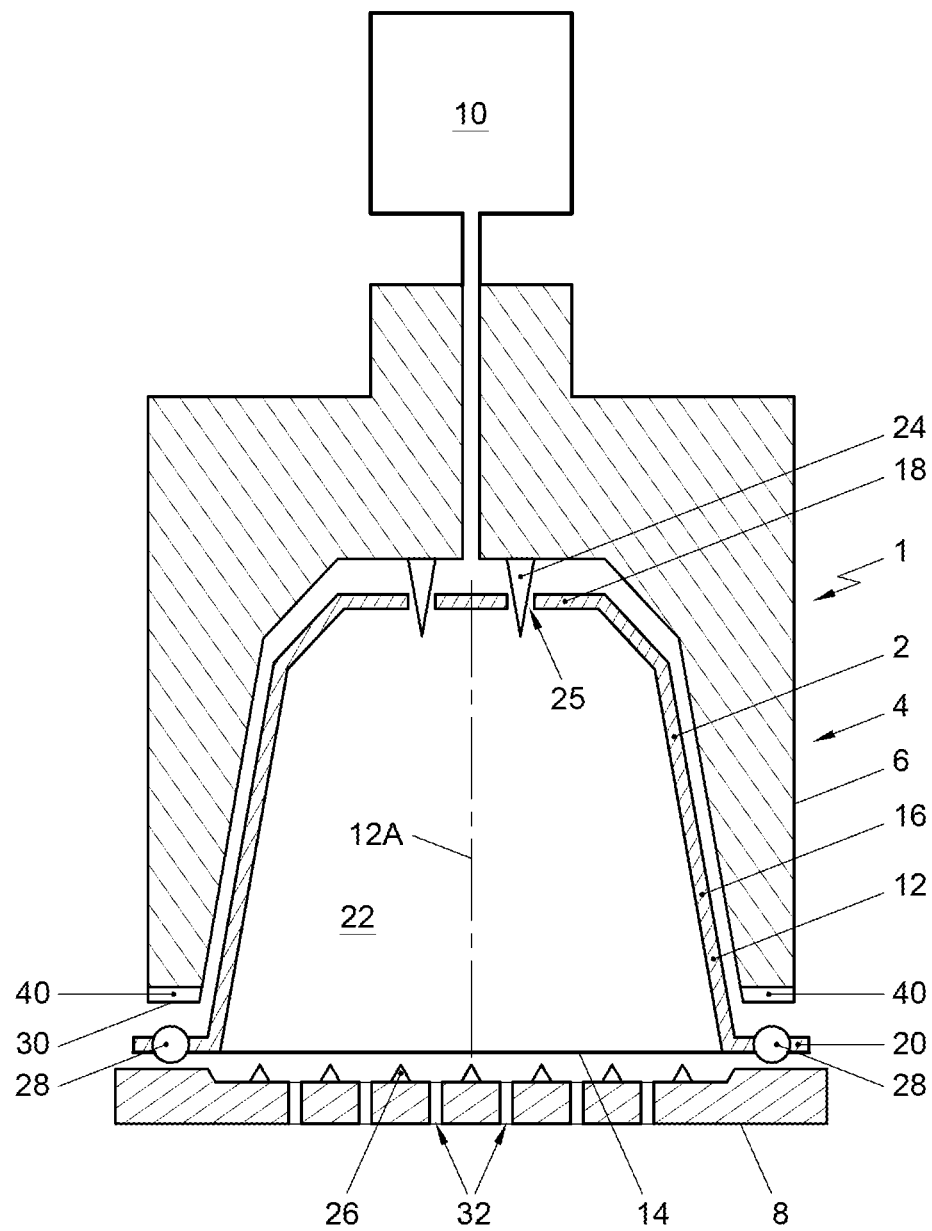
FIG. 1 shows a schematic representation of an embodiment of a system according to the invention.

FIG. 1 shows a schematic representation, in cross sectional view, of an embodiment of a system 1 for preparing a potable beverage from a capsule using a fluid supplied under pressure into the capsule. The system 1 comprises a capsule 2 that is sealed so as to be sealed, and a beverage preparation device 4. The device 4 comprises enclosing member 6 for holding the capsule 2. The device 4 further comprises a closing member, such as an extraction plate, 8 for supporting the capsule 2.

In FIG. 1 a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The apparatus 4 further comprises a fluid injection means 10 for supplying an amount of a fluid, such as water, under a pressure in the range of 6-20 bar, preferably between 12 and 18 bar, to the exchangeable capsule 2.

In the example shown in FIG. 1, the exchangeable capsule 2 comprises an aluminum capsule body 12 having a central capsule body axis 12A and an aluminum cover (which may alternatively be referred to herein as a cover sheet) 14. In this example, the aluminum capsule body 12 comprises a side wall 16, a bottom 18 closing the side wall 16 at a first end, and a outwardly extending flange 20 extending outwardly of the side wall 16 at a second end opposite the bottom 18. The side wall 16, the bottom 18 and the cover 14 enclose an inner space 22 comprising a substance for the preparation of a potable beverage by extracting and/or dissolving the substance. Preferably the substance is 5-20 grams, preferably 5-10 grams, more preferably 5-7 grams of an extractable product, such as roasted and ground coffee for the preparation of a single beverage. The capsule is initially sealed, i.e. is sealed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises cover piercing means 26, here embodied as protrusions of the closing member 8, for piercing the cover 14 of the capsule 2. The cover piercing means 26 may be arranged to tear the cover 14 once a (fluid) pressure inside the inner space 22 exceeds a threshold pressure and presses the cover 14 against the cover piercing means 26 with sufficient force. The aluminum cover 14 thus is arranged to tear open on the closing member 8 of the beverage preparation device under the influence of fluid pressure in the capsule.

The capsule 2 further comprises a sealing structure 28, in FIGS. 1, 3A and 3B indicated as a general box but more detailed described with reference to FIGS. 4A-4H, which sealing structure 28 is arranged at the outwardly extending flange 20 for providing a fluid sealing contact with the enclosing member 6 if the capsule 2 is positioned in the enclosing member 6 and the enclosing member 6 is closed by means of the extraction plate 8, such that the outwardly extending flange 20 of the capsule 2 and at least a portion of the sealing structure 28 are sealingly engaged between the enclosing member 6 and the extraction plate 8.

Figure 2:
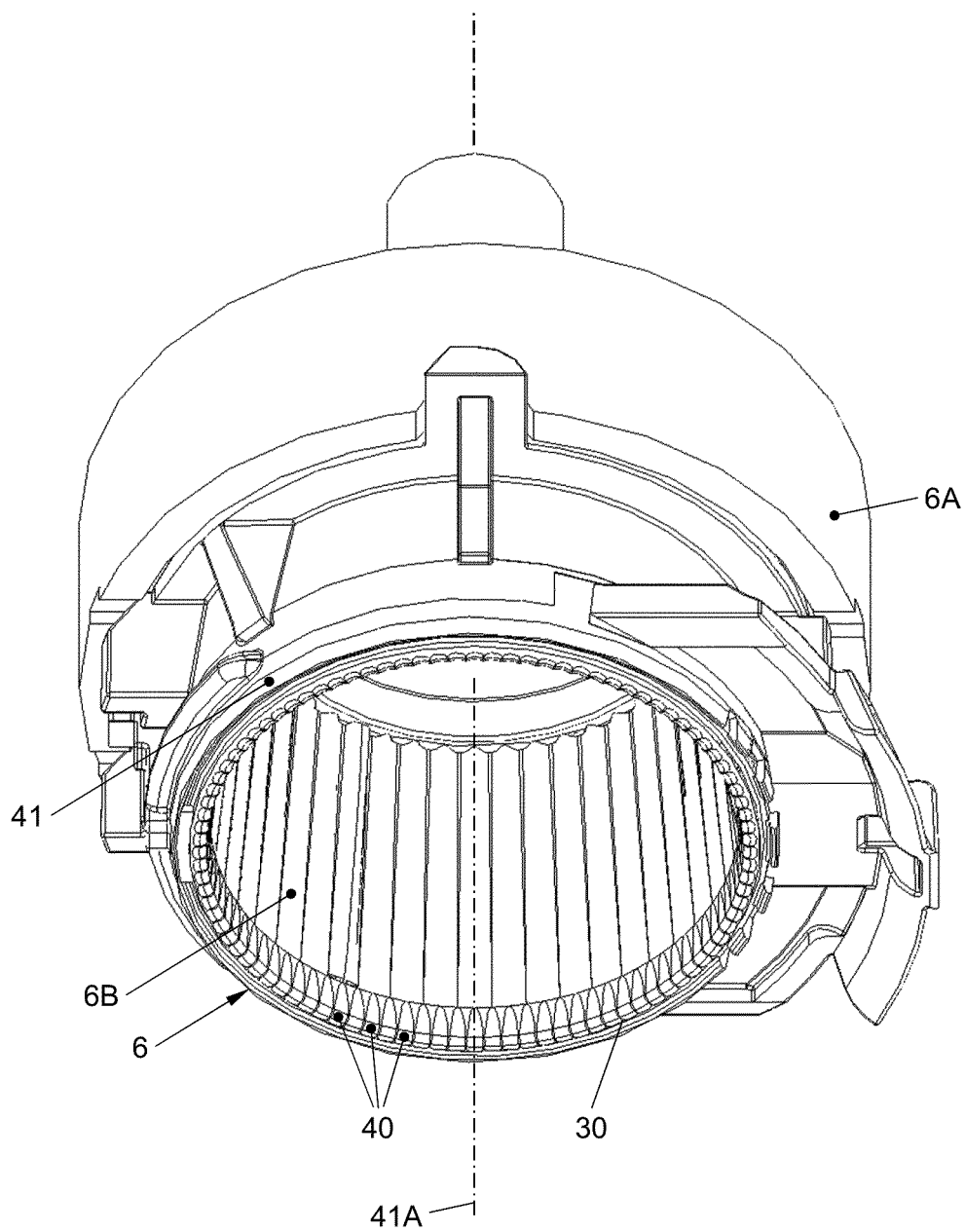
FIG. 2 in a perspective view shows an embodiment of a beverage preparation device of a system according to the invention showing the annular end surface of the enclosing member of the beverage preparation device with the plurality of radially extending open grooves.

As shown in FIG. 2 the enclosing member 6 of the beverage preparation device comprises an annular element 41 having a central annular element axis 41A and a free annular end surface 30. The free annular end surface 30 of the annular element 41 is provided with a plurality of radially extending open grooves 40. The plurality of radially extending open grooves 40 are uniformly spaced relative to each other in tangential direction of the free annular end surface 30 of the annular element 41. The longest tangential width of each groove 40 is 0.9-1.1 mm, preferably 0.95 to 1.05 mm, more preferably 0.98 to 1.02 mm, wherein a maximal height of each groove 40 in an axial direction of the enclosing member 6 is 0.01-0.09 mm, preferably 0.03 to 0.07 mm, more preferably 0.045 to 0.055 mm, and most preferred 0.05 mm. The number of grooves 40 lies in the range of 90 to 110, preferably 96. The radial width of the annular end surface at the location of the grooves may for instance be 0.05-0.9 mm, preferably 0.2-0.7 mm and more preferably 0.3-0.55 mm.

Figure 3A:
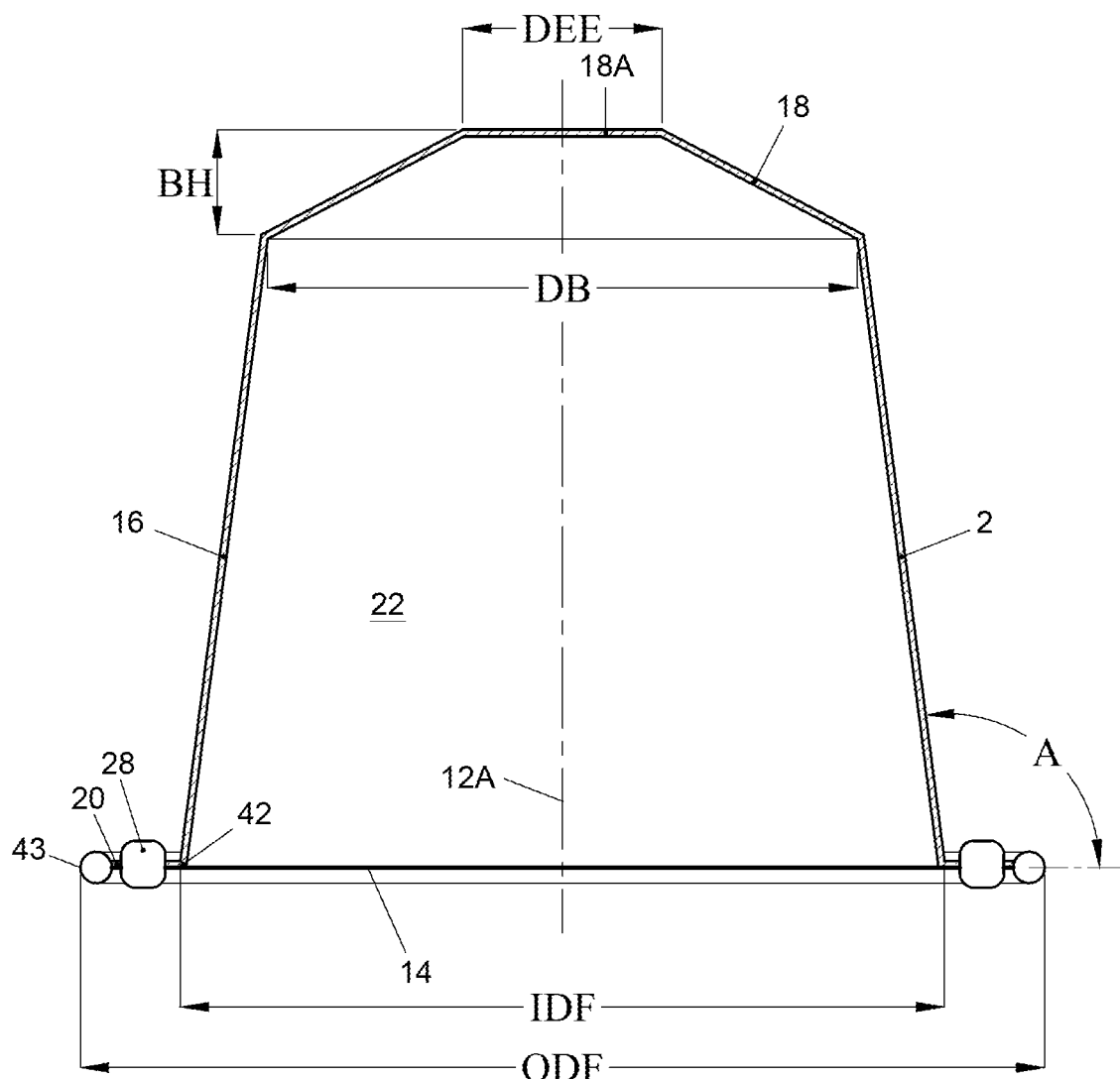
FIG. 3A in cross section shows an embodiment of a capsule according to the invention before use.
Figure 3B:
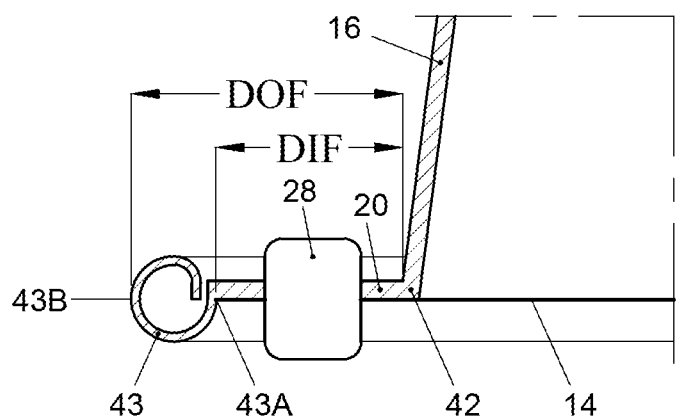
FIG. 3B shows an enlarged detail of a the capsule of FIG. 3A showing the outwardly extending flange and the sealing structure.

An embodiment of a capsule according to the invention is shown more detailed in FIGS. 3A and 3B. In the shown embodiment the outer diameter ODF of the outwardly extending flange 20 is larger than the diameter DB of the bottom 18 of the capsule 2. In the shown embodiment the outer diameter ODF of the outwardly extending flange 20 is approximately 37.1 mm and the diameter DB of the bottom 18 is about 23.3 mm. In the present example, the wall thickness of the aluminum capsule body 12 is 100 micrometer. Generally, a wall thickness of, depending on various considerations, 20 to 200 micrometer is preferred.

In the shown embodiment the thickness of the aluminum cover 14 is 39 micrometer, preferred thickness ranging from 15-65 micrometer and more in particular 30-45 micrometer. Preferably the thickness of the aluminum cover 14 is smaller than the thickness of the aluminum capsule body 12.

The side wall 16 of the aluminum capsule body 12 has a free end 42 opposite the bottom 18. The inner diameter IDF of the free end 42 of the side wall 16 of the aluminum capsule body 12 is about 29.5 mm. The outwardly extending flange 20 extends from that free end 42 in a direction at least substantially transverse to the central capsule body axis 12A. The outwardly extending flange 20 comprises a curled outer edge 43 which is beneficial for obtaining a seal between the capsule and the enclosing member. In the shown embodiment the curled outer edge 43 of the outwardly extending flange 20 has a largest dimension of about 1.2 millimeter. The distance DIF between the free end 42 of the side wall 16 of the aluminum capsule body 12 and an inner edge 43A of the curled outer edge 43 is about 2.7 mm, while the distance DOF between the free end 42 of the side wall 16 of the aluminum capsule body 12 and an outermost edge 43B of the outwardly extending flange 20 is about 3.8 millimeter.

As shown in FIGS. 3A and 3B the sealing structure 28 is positioned between the free end of the side wall 16 of the aluminum capsule body 12 and the inner edge 43A of the curled outer edge 43 of the outwardly extending flange. The sealing structure 28 is indicated as a general box, but will be described in more detail below. Irrespective of the embodiment of the sealing structure 28 the height of the sealing structure is preferably at least about 0.1 mm, more preferably at least 0.2 mm and most preferably at least 0.8 mm and at most 3 mm, more preferably at most 2 mm and most preferably at most 1.2 mm for providing a correct seal.

As can be seen from FIG. 3A the aluminum capsule body 12 is truncated. In the embodiment shown, the side wall 16 of the aluminum capsule body 12 encloses an angle A with a line transverse to the central capsule body axis 12A of about 97.5°. The bottom 18 of the aluminum capsule body 12 has a largest inner diameter DB of about 23.3 mm. The bottom 18 of the aluminum capsule body 12 is also truncated, and in the shown embodiment has a bottom height BH of about 4.0 mm. The bottom 18 further has a generally flat central portion 18A opposite the cover 14, which central portion 18A has a diameter DEE of about 8.3 mm and in which central portion 18A the entrance opening(s) 25 may be made. The entrance openings may also be made in the truncated portion between the central portion 18A and the side wall 16. The total height TH of the aluminum capsule body 12 of the capsule is about 28.4 mm.

The system 1 shown in FIG. 1 is operated as follows for preparing a cup of a potable beverage, in the present example coffee the substance in the capsule being roasted and ground coffee.

The capsule 2 is placed in the enclosing member 6. The extraction plate 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the cover 14 to deform and be pressed against the lid piercing means 26 of the extraction plate. Once the pressure reaches a certain level, the tear strength of the cover 14 will be surpassed and the cover 14 will rupture against the lid piercing means 26, creating exit openings. The prepared coffee will drain from the capsule 2 through the exit openings and outlets 32 (see FIG. 1) of the extraction plate 8, and may be supplied to a container such as a cup (not shown).

The system 1 is arranged such that prior to or at the start of brewing, the free annular end surface 30 of the enclosing member 6 exerts a force F1 on the sealing structure 28 of the capsule 2 to provide a sealing contact between the outwardly extending flange 20 of the capsule 2 and the enclosing member 6 of the beverage preparation device, wherein the force F1 is in the range of 30-150 N, preferably 40-150 N and more preferably 50-100N, when the fluid pressure P1 in the enclosing member of the beverage preparation device outside the capsule is in the range of 0.1-4 bar, preferably 0.1-1 bar. During brewing, the free annular end surface 30 of the enclosing member 6 exerts a force F2 on the sealing structure 28 of the capsule 2 to provide a sealing contact between the outwardly extending flange 20 of the capsule 2 and the enclosing member 6, wherein the force F2 is in the range of 500-1500 N, preferably in the range of 750-1250 N, when the fluid pressure P2 in the enclosing member 6 of the beverage preparation device outside the capsule 2 is in the range of 6-20 bar, preferably between 12 and 18 bar. In the shown embodiment a part 6B of the enclosing member 6 can move relative to the extracting plate 8 under the effect of the pressure of the fluid in the enclosing member 6 device towards the extraction plate 8 for applying the maximum force between the outwardly extending flange 20 and the free annular end surface 30 of the enclosing member 6. This movement can take place during use, i.e. at the start of brewing and during brewing. The enclosing member 6 has a first part 6A and a second part 6B wherein the second part comprises the free annular end surface 30. The second part 6B can move relative to the first part 6A between a first and second position. The second part 6B can move from the first position towards the second position in the direction of the closing member 8 under the influence of fluid pressure in the enclosing member 6. The force F1 as discussed above may be reached if the second part 6B is in the first position with a fluid pressure P1. The force F2 as discussed above may be reached if the second part 6B is moved towards the second position under the influence of the fluid pressure P2 in the enclosing member 6.

Figure 3C:
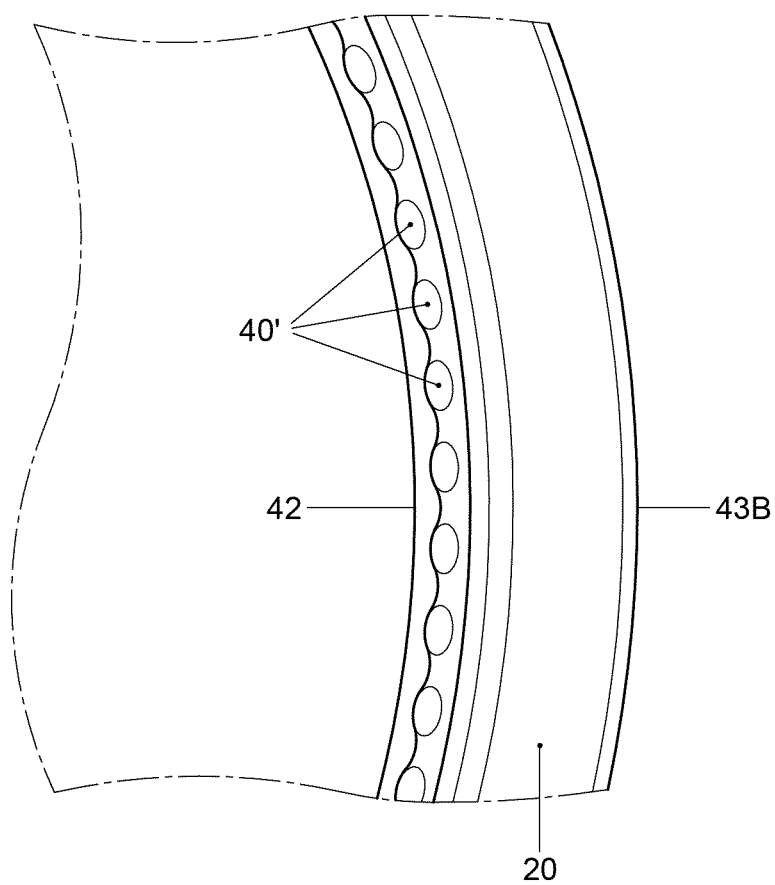
FIG. 3C shows an enlarged detail of the outwardly extending flange of the capsule in FIGS. 3A and 3B after use.

As a result of the force applied the sealing structure 28 of the capsule according to the invention undergoes a plastic deformation and closely conforms to the grooves 40 of the free annular end surface 30 and thus provides a sealing contact between the enclosing member 6 and the capsule 3 at a relatively low fluid pressure during start up of brewing but also provides a sealing contact at the much higher fluid pressure in the enclosing member outside the capsule during brewing. This close conformation to the grooves 40 of the enclosing member is indicated in FIG. 3C which shows the capsule 2 of the invention after use, and which clearly indicates that the outwardly extending flange 20 comprises deformations 40' which conform to the grooves 40 of the enclosing member.

Now exemplary embodiments of a sealing structure 28 at the outwardly extending flange 20 of the capsule 2 according to the invention will be described in more detail with regard to FIGS. 4A to 4H.

Figure 4A:
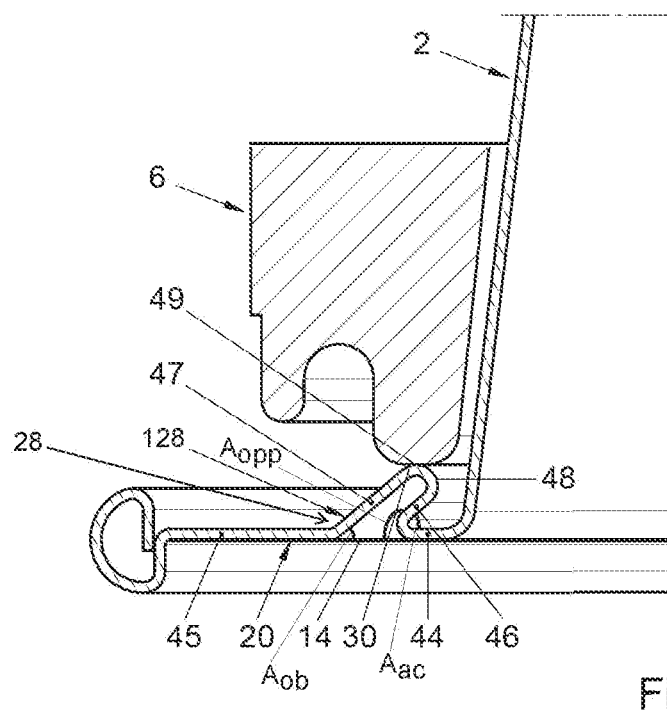
FIGS. 4A to 4H show several embodiments of a sealing structure at the outwardly extending flange of a capsule according to the invention.

In FIG. 4A, a first example of flange 20 with a sealing structure 28 in contact with an annular end surface of an enclosing member 6 prior to deformation of the sealing structure 28 is shown. The sealing structure 28 is in the form of a deformable sealing ring portion 128 of the flange 20. The cover 14 is attached to base portions 44, 45 of the flange 20, which define a flat base level plane of the flange 20 perpendicular to the capsule body axis. The sealing ring portion 128 projects axially from the base portions 44, 45 of the flange 20 on a side of the base portions 44, 45 opposite of the cover 14 (i.e. the side facing the free annular end surface 30).

The deformable sealing ring portion 128 has an inner wall portion 46 extending from and contiguous with an inner base portion 44 of the flange 20 and an outer wall portion 47 extending from and contiguous with an outer base portion 45 of the flange 20. The outer wall portion 47 is located outward of and spaced from the inner wall portion 46. The deformable sealing ring portion 128 further includes a bridge portion 48 interconnecting the inner wall portion 46 and the outer wall portion 47. The bridge portion 48 is located axially spaced from the base portions 44, 45 of the flange 20.

In the cross-sectional view as shown, a top 49 of the bridge portion axially most remote from the base portions of the flange 44, 45 has a center plane curved with a radius of curvature larger than two times the wall thickness of the top 49 of the bridge portion 48. Because the radius of curvature is relatively large, it can be deformed relatively easily to accommodate to the shape of the free annular end surface 30 as the free annular end surface 30 is pressed against the deformable sealing ring portion 128 causing it to be deformed. Since the deformable sealing ring portion 128 is an integral portion of the capsule body, it can be manufactured efficiently and, being of the same material as the rest of the capsule body, it can be recycled together with the rest of the capsule body after use and disposal of the capsule.

The inner wall portion 46 is oriented at a different angle to the base portions of the flange 44, 45 than the outer wall portion 47. This results in accurate and reliable deformation of the sealing structure 28 to a predetermined shape during sealing. In particular, it is avoided that transitions between circumferential sections deforming to different end shapes are formed during deformations. Such transitions entail an increased risk of leakage.

In the present example, this effect is achieved particularly effectively because the outer wall portion 47 extends at an oblique angle $A_{ob}$ relative to a plane of the associated contiguous base portion of the flange 45 and the inner wall portion 46 extends from the associated contiguous base portion of the flange 44 at an acute angle $A_{ac}$ and opposite angle $A_{opp}$, so that it is parallel to the outer wall portion 47. The oblique angle $A_{ob}$ and the acute angle $A_{ac}$ is each preferably 20-60°, and more preferably 30-50°, and the opposite angle $A_{opp}$ is preferably 120-160°, and more preferably 110-150° relative to a plane of the respective, associated contiguous base portions of the flange 44, 45.

Figure 4B:
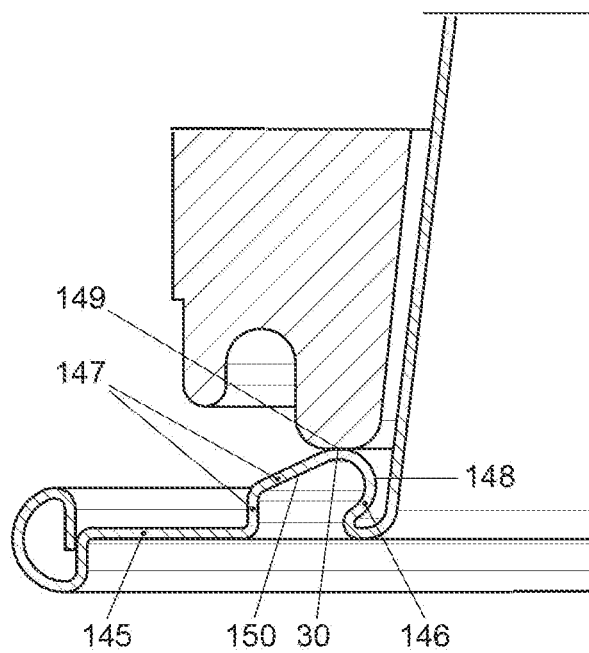

In the example shown in FIG. 4B, the outer wall portion 147 is about perpendicular the base portion of the flange 147 contiguous therewith. In addition to a curved portion including the top portion 149, the bridge portion 148 also has an oblique, generally flat portion 150. For a smooth, accurate and reliable deformation to a predetermined shape, the inner wall portions 146 has a curved center plane contiguous to the curvature of the top of said bridge portion. The relatively easy compressibility of the curved inner wall portion 146 is accommodated by a generally hinging deflection of the flat portion 150 of the bridge portion about its connection to the outer wall portion 147. Thus, it is avoided that the inner wall portion 146 and an adjacent portion of the bridge portion 148 are folded flat to one side and ensured that the curved sections formed by these portions is folded onto itself during deformation, thereby ensuring that during deformation a relatively constant counterforce is exerted.

Figure 4C:
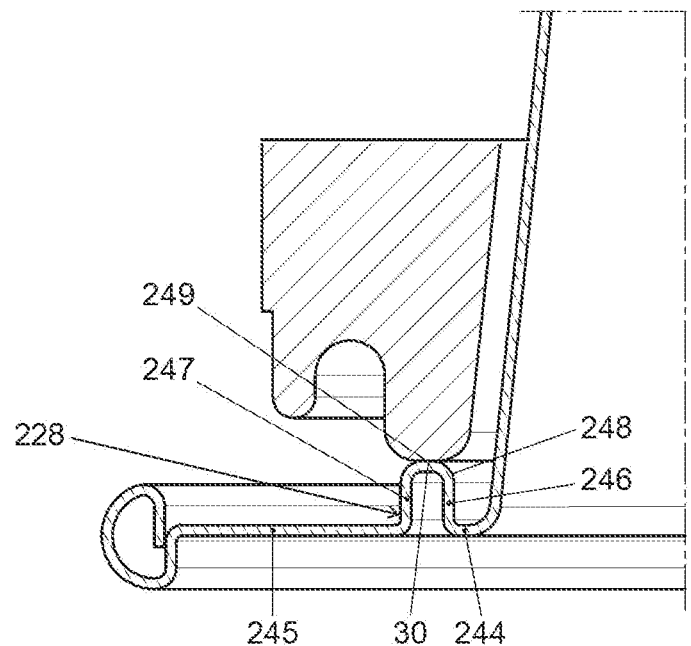

In FIG. 4C, an example is shown in which the top 249 of the bridge portion 248 is flat (i.e. has an infinitely large radius of curvature). Also, such a flat wall portion is deformable relatively easily for smooth accommodation to the shape of the free annular end surface 30. The inner and outer wall portions 246, 247 are oriented perpendicularly to the adjacent base portions of the flange 244, 245, so that a particularly stiff support of the bridge portion 248 is obtained, which prevents the bridge portion from being displaced as a whole as a result of the pressure exerted by the free annular end surface 30, so deformations are, at least initially, concentrated in the bridge portion 248 itself. In turn, this is advantageous for accommodation of the shape of the sealing ring portion 228 to the shape of the free annular end surface 30. A particularly effective and reliable sealing already at low sealing pressure can be achieved if at least a portion of the top 249 of the bridge portion 248 has a reduced wall thickness smaller than a wall thickness of the inner and outer wall portions 247, 246 (the reduced wall thickness is not shown in FIG. 4C). In this and other embodiments, the reduced thickness may of at least the top portion of the bridge portion may for instance be 10-95 micrometer, more preferably 30-70 micrometer, most preferably 40-50 micrometer.

Figure 4D:
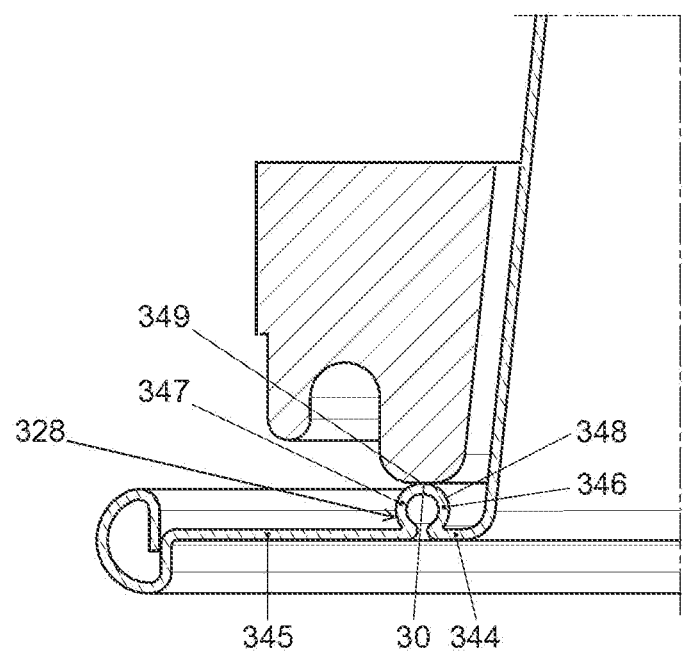

In the example shown in FIG. 4D, the deformable sealing ring portion 328 is Ω shaped, the inner wall portion 346, the bridge portion 348 with top 349 and the outer wall portion 347 having an essentially constant radius of curvature. Such a shape is particularly advantageous for a smooth, accurate and reliable deformation to a predetermined shape. Another advantage of such a shape is that only a small gap is left between inner and outer base portions of the flange 344, 345 so that a large surface area for adherence of the cover (also referred to herein as cover sheet) 14 to the flange is left.

Figure 4E:
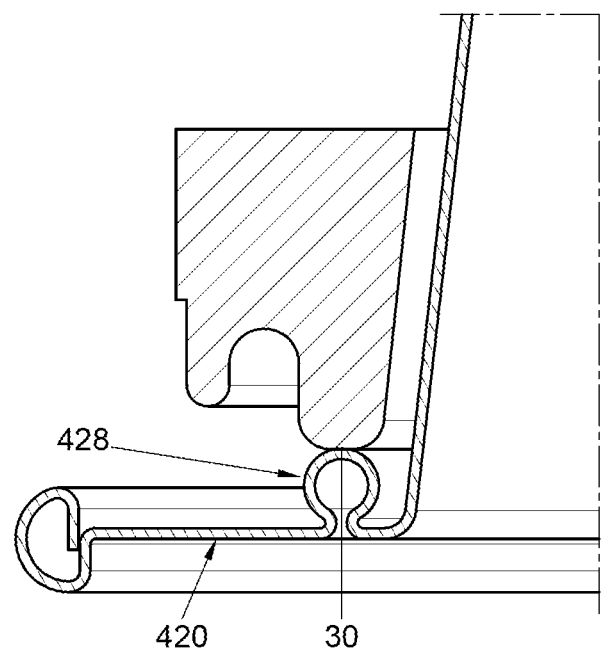

Also in the example shown in FIG. 4E, the deformable sealing ring portion 428 is Ω shaped, but has a larger radius of curvature, such that the width of the Ω shaped portion is at least as wide as the width of the free annular end surface 30. This allows the annular end surface to be pressed into the (originally) Ω shaped portion, of which the width increases during deformation, so that a particularly effective double sealing is achieved at outer and inner border areas of free annular end surface 30.

Figure 4F:
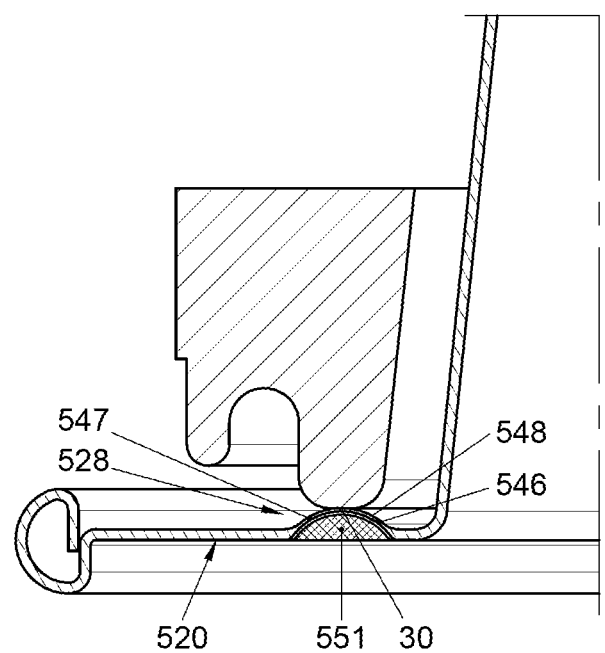

In the example shown in FIG. 4F, a support member 551 of a relatively resilient material is provided between the inner and outer wall portions 546, 547 and under the bridge portion 548 for obtaining a high counter pressure during a final stage of deformation of the sealing structure. Such a support member is particularly advantageous if, as in the present example, the deformable sealing ring portion 528 is of a relatively flat configuration.

Figure 4G:
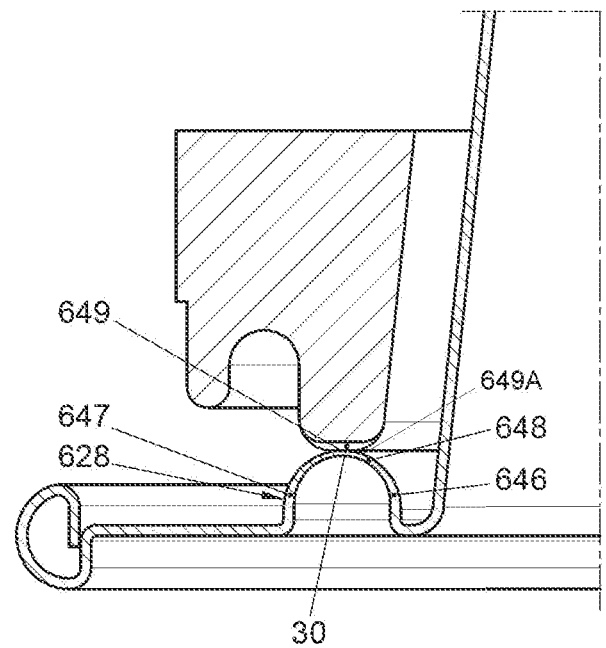

A particularly good conformability to the shape of the free annular end surface 30 and accordingly a particularly effective and reliable sealing already at low sealing pressure can be achieved if, as in the example shown in FIG. 4G, at least a portion of the top 649 of the bridge portion 648 has a reduced wall thickness smaller than a wall thickness of the inner and outer wall portions 647, 646.

The bridge portion 649 may have an uncoated surface facing the free annular end surface 30 whereas the rest of the capsule body material may be coated on the same side or on both sides, to avoid damage to the coating during reduction of the wall thickness or by removing the coating while reducing the wall thickness. While the coating is removed, a texture may be applied to the surface from which the coating is removed, forming a textured surface 649A. Such a texture, preferably including ridges and valleys in circumferential sense of the flange, can further improve the conformability during early stages of clamping, when the sealing pressure is still low, because clamping force is transferred via raised portions of the texture only, so that at the raised portions a higher contact pressure is exerted than would be exerted over a full smooth contact surface.

Figure 4H:
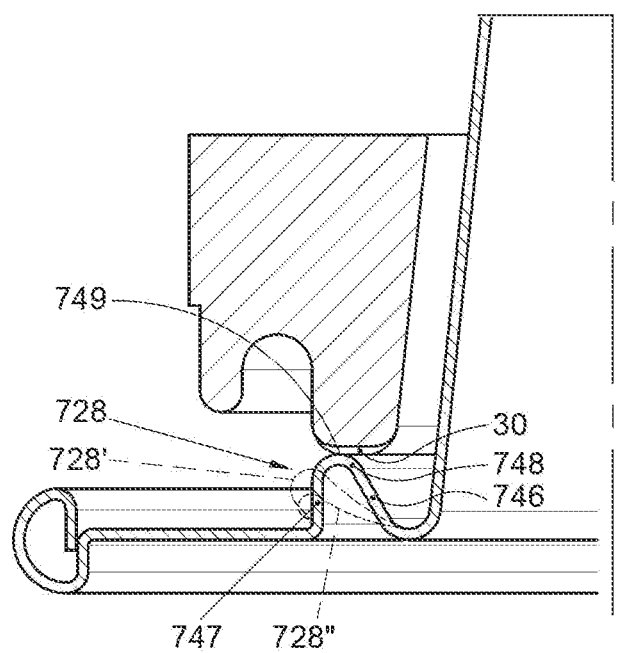

In FIG. 4H, an example is shown in which one of the wall portions 746, 747 (in this case the outer wall portion 747) is oriented more steeply relative to the base portions of the flange 744, 745 than the other one of the wall portions 746, 747 (in this case the inner wall portion 746), which is oriented obliquely relative to the base portions of the flange 744, 745. Also in this example, the oblique inner wall portion 746, which pivots as it follows deformation of the bridge portion 748 and of the steep outer wall portion 747, prevents the steep outer wall portion 747 that is deformed most from folding over. The steep outer wall portion 747 is positioned, such that it is deflected to the outside of the free annular end surface 30 as the enclosing member is pushed against the top portion 749 of the bridge portion. The wall material of a top end of the steep outer wall portion 747 is then deformed in a rolling off fashion as it follows the bridge portion 748 that is pushed down and radially held by the pivoting inner wall portion 746, as is illustrated by the deformed conditions 728' and 728" of the deformable sealing portion 728 shown in FIG. 4H. Thus, initially a local deformation accommodating to the shape of the free annular end surface 30 is achieved when the free annular end surface 30 is pressed against the top portion 749 of the bridge portion 748. Subsequently, the deformation in a rolling off fashion allows smooth axial deformation over a large trajectory.

In each of the examples shown in FIG. 4A-4H, the top of the bridge portion is positioned for being contacted first by the free annular end surface 30, when the sealing ring portion is clamped between the annular end surface and the closing member of a compatible beverage preparation device. The diameter of the top of the bridge portion is moreover such that the top of the bridge portion is located centrally relative to the free annular end surface 30 for first contacting a central portion of that annular end surface when the sealing ring portion is clamped between the annular end surface and said closing member of a compatible beverage preparation device.

In the foregoing specification, the invention has been described with reference to specific examples of embodiments of the invention. It will, however, be evident that various modifications and changes may be made therein without departing from the broader spirit and scope of the invention as set forth in the appended claims.

The invention claimed is:

1. A capsule containing a substance for the preparation of a potable beverage by extracting and/or dissolving the substance by supplying a fluid under pressure into the capsule, said capsule comprising:
  an aluminum capsule body having a central capsule body axis, said aluminum capsule body comprising a bottom, a side wall, an outwardly extending flange and a sealing structure at said outwardly extending flange; and
  a cover sheet attached to said outwardly extending flange and hermetically closing off the capsule;
  wherein said sealing structure is deformable for providing a fluid sealing contact with an annular end surface of an enclosing member of a beverage preparation device when the capsule is positioned in said enclosing member and said enclosing member is closed by a closing member of the beverage preparation device, at least portions of said outwardly extending flange and said sealing structure is clamped between said annular end surface and said closing member;
  wherein said sealing structure includes a deformable sealing ring portion of said outwardly extending flange, said sealing ring portion projecting axially from base portions of said outwardly extending flange, to which said cover sheet is attached, on a side of said base portions opposite of said cover sheet, said deformable sealing ring portion comprising:
    an inner wall portion extending from and contiguous with an inner base portion of said outwardly extending flange;
    an outer wall portion extending from and contiguous with an outer base portion of said outwardly extending flange, said outer wall portion is located radially outward of and radially spaced from said inner wall portion;
    a bridge portion interconnecting said inner wall portion and said outer wall portion, said bridge portion is located axially spaced from said base portions of said outwardly extending flange;
    wherein, in radial cross-sectional view, a top of said bridge portion axially most remote from said base portions of the outwardly extending flange is curved with a radius of a curvature larger than two times a wall thickness of said top of said bridge portion, wherein at least a portion of the top of said bridge portion has a reduced wall thickness smaller than a wall thickness of said inner and outer wall portions, wherein said outer wall portion extends at an oblique angle relative to a plane of the associated contiguous outer base portion of the outwardly extending flange and said inner wall portion extends from the associated contiguous inner base portion of the outwardly extending flange at a steeper or opposite angle relative to the plane of the associated contiguous inner base portion of the outwardly extending flange, and wherein, in cross-sectional view, at least a portion of said inner wall portion is a curved portion and said curved portion of said inner wall portion is contiguous to the curvature of said top of said bridge portion, the inner wall portion is undercut by the associated contiguous inner base portion of the outwardly extending flange and at least a part of the inner wall portion is oriented at an acute angle relative to the contiguous inner base portion of the outwardly extending flange and overhangs the contiguous inner base portion of the outwardly extending flange, and the curved portion of the inner wall portion and the contiguous inner base portion of the outwardly extending flange is folded onto itself during deformation; and a coating to at least one side of said aluminum capsule body, wherein said coating is absent in at least said portion of the top of said bridge portion having a reduced wall thickness, wherein said portion of the top of said bridge portion where the coating is absent is on a side of said outwardly extending flange opposite of said cover sheet and has a textured surface.

2. The capsule according to claim 1, wherein said textured surface includes ridges and valleys extending in circumferential sense of said outwardly extending flange.

3. The capsule according to claim 1, wherein said outer wall portion extends at an oblique angle of 20-60° relative to a plane of the associated contiguous base portion of the outwardly extending flange and said inner wall portion extends from the associated contiguous base portion of the outwardly extending flange at an angle of 60-160° relative to said plane of the associated contiguous base portion of the outwardly extending flange.

4. The capsule according to claim 1, wherein, in cross-sectional view, at least a portion of said outer wall portion has a curved center plane.

5. The capsule according to claim 4, wherein said curved portion of said outer wall portion is contiguous to the curvature of said top of said bridge portion.

6. The capsule according to claim 5, wherein, in cross-sectional view said deformable sealing ring portion is Ω shaped.

7. The capsule according to claim 1, further comprising a support member between said inner and outer wall portions.

8. The capsule according to claim 1, wherein said top of said bridge portion is contacted first by said annular end surface, when said sealing ring portion is clamped between said annular end surface and said closing member of a compatible beverage preparation device.

9. The capsule according to claim 8, wherein said top of said bridge portion forms a crest extending circumferentially about the center line of the capsule, said crest having a diameter of 29-33 mm.

10. The capsule according to claim 1, wherein the capsule is filled with 5-20 grams.

11. The capsule according to claim 1, wherein the outer diameter of the outwardly extending flange of the capsule is larger than the diameter of the bottom of the capsule.

12. The capsule according to claim 11, wherein the outer diameter of the outwardly extending flange is 37.1 mm and the diameter of the bottom of the capsule is 23.3 mm.

13. The capsule according to claim 1, wherein the thickness of the aluminum capsule body is 20 to 200 micrometer.

14. The capsule according to claim 1, wherein the cover sheet is of aluminum having a thickness of 15 to 65 micrometer.

15. The capsule according to claim 1, wherein the aluminum capsule body has a wall thickness larger than the wall thickness of the cover sheet.

16. The capsule according to claim 1, wherein the cover sheet is arranged to tear open on the closing member of the beverage preparation device under the influence of fluid pressure in the capsule.

17. The capsule according to claim 1, wherein the side wall of the aluminum capsule body has a free end opposite the bottom, the outwardly extending flange extending from said free end of the side wall in a direction transverse to the central capsule body axis.

18. The capsule according to claim 15, wherein the outwardly extending flange comprises a curled outer edge radially outside of said sealing portion.

19. The capsule according to claim 18, wherein an inner edge of the curled outer edge of the outwardly extending flange has a radius about the central capsule body axis of at least 32 mm.

20. The capsule according to claim 18, wherein the curled outer edge of the outwardly extending flange has a largest radial cross-sectional dimension of 1.2 millimeter.

21. The capsule according to claim 17, wherein the inner diameter of the free end of the side wall of the aluminum capsule body is 29.5 mm.

22. The capsule according to claim 5, wherein the distance between the free end of the side wall of the aluminum capsule body and an outermost edge of the outwardly extending flange is 3.8 millimeter.

23. The capsule according to claim 1, wherein the aluminum capsule body has a height in axial direction of 28.4 mm.

24. The capsule according to claim 1, wherein the aluminum capsule body is truncated, wherein the side wall of the aluminum capsule body encloses an angle with a line transverse to the central capsule body axis of 97.5°.

25. The capsule according to claim 1, wherein the bottom of the aluminum capsule body has a largest inner diameter of 23.3 mm.

26. The capsule according to claim 25, wherein the bottom of the aluminum capsule body is truncated and has a bottom height of 4.0 mm and wherein the bottom further has a flat central portion opposite the cover sheet having a diameter of 8.3 mm.

27. The capsule according to claim 1, wherein the sealing structure has a height in axial direction of at least 0.1 mm.

28. The capsule according to claim 1, wherein the sealing ring portion is deformable and effectively seals against the annular end surface when during brewing, said annular end surface exerts a force F on the sealing structure of the capsule to provide a sealing contact between said outwardly extending flange and said annular end surface, wherein F is in the range of 500-1500 N when the fluid pressure in said enclosing member outside the capsule is in the range of 6-20 bar.

29. The capsule according to claim 1, wherein the sealing ring portion is deformable and effectively seals against the annular surface when, in use, prior to or at the start of brewing, said annular end surface exerts a force F1 on the sealing structure of the capsule to provide a sealing contact between said outwardly extending flange and said annular end surface, wherein the force F1 is in the range of 30-150 N when the fluid pressure P1 in the enclosing member of the beverage preparation device outside the capsule is in the range of 0.1-4 bar.

30. The capsule according to claim 1, wherein the sealing ring portion is deformable and effectively seals against the annular surface when the annular end surface that is pressed against the sealing ring portion has a plurality of radially extending open grooves uniformly spaced relative to each other in circumferential sense of said annular end surface.

31. The capsule according to claim 30, wherein the sealing ring portion is deformable and effectively seals against the annular surface when the greatest width of each of said grooves is 0.9 - 1.1 mm, wherein a maximal height of each of said grooves in an axial direction of the enclosing member of the beverage preparation device is 0.01 - 0.09 mm, and wherein the number of said grooves is 90 to 110, and wherein the radial width of the annular end surface at the location of the grooves is 0.05- 0.9 mm.

32. The capsule according to claim 1, wherein the sealing ring portion and the remainder of the aluminum capsule body are made of the same plate material.

* * * * *